United States Patent
Hild et al.

(10) Patent No.: US 8,371,328 B2
(45) Date of Patent: Feb. 12, 2013

(54) BACK PRESSURE VALVE WITH INDUCTIVELY HEATED FLAP

(75) Inventors: Thomas Hild, Mainz-Kastel (DE); Andreas Koenekamp, Darmstadt (DE)

(73) Assignee: GM Global Technology Operations LLC, Detroit, MI (US)

( * ) Notice: Subject to any disclaimer, the term of this patent is extended or adjusted under 35 U.S.C. 154(b) by 514 days.

(21) Appl. No.: 11/945,455

(22) Filed: Nov. 27, 2007

(65) Prior Publication Data

US 2009/0133758 A1    May 28, 2009

(51) Int. Cl.
*F16K 49/00*    (2006.01)
(52) U.S. Cl. ......... 137/341; 251/305; 251/368; 219/641
(58) Field of Classification Search .................. 137/341, 137/334; 429/34; 219/628–631, 641, 643; 251/305, 368
See application file for complete search history.

(56) References Cited

U.S. PATENT DOCUMENTS

| | | | | |
|---|---|---|---|---|
| 2,178,721 A * | 11/1939 | Daniels | | 219/643 |
| 2,441,312 A * | 5/1948 | Dickerson et al. | | 219/635 |
| 4,176,823 A * | 12/1979 | Gliatas | | 251/306 |
| 6,046,442 A * | 4/2000 | Kawamura et al. | | 219/667 |
| 6,488,345 B1 | 12/2002 | Woody et al. | | |
| 6,555,801 B1 | 4/2003 | LeMieux et al. | | |
| 6,717,118 B2 * | 4/2004 | Pilavdzic et al. | | 219/601 |
| 7,040,596 B2 | 5/2006 | Sonoda et al. | | |
| 2002/0100891 A1 | 8/2002 | Barton et al. | | |
| 2002/0146607 A1 | 10/2002 | Kai et al. | | |
| 2004/0106026 A1* | 6/2004 | Fujita et al. | | 429/24 |
| 2004/0224200 A1* | 11/2004 | Ichikawa et al. | | 429/25 |
| 2005/0031922 A1 | 2/2005 | Clingerman et al. | | |
| 2005/0186457 A1 | 8/2005 | Clingerman et al. | | |
| 2006/0115694 A1 | 6/2006 | Igarashi et al. | | |
| 2006/0214128 A1* | 9/2006 | Horner et al. | | 251/305 |
| 2006/0219709 A1* | 10/2006 | Kagan | | 219/661 |

FOREIGN PATENT DOCUMENTS

JP    63134826 A    6/1988
WO    9945242 A1    9/1999

* cited by examiner

*Primary Examiner* — John Fox
*Assistant Examiner* — Kevin Murphy
(74) *Attorney, Agent, or Firm* — Fraser Clemens Martin & Miller LLC; J. Douglas Miller

(57) ABSTRACT

A back pressure valve for a fuel cell stack assembly is disclosed, wherein the valve includes a solenoid disposed thereon, an energization of the solenoid causing a generation of heat in a valve flap to facilitate a melting of ice that has formed in the valve.

12 Claims, 2 Drawing Sheets

BACK PRESSURE VALVE WITH INDUCTIVELY HEATED FLAP

FIELD OF THE INVENTION

The present invention relates generally to fuel cell stacks and more particularly to back pressure valves having heated flaps to facilitate a melting of ice that has formed on the valve.

BACKGROUND OF THE INVENTION

A fuel cell system is an electro-chemical device that includes an anode and a cathode with an electrolyte therebetween. The anode receives a fuel such as hydrogen and the cathode receives an oxidant such as oxygen or air. When the hydrogen is supplied to a reaction plane of the anode, the hydrogen is ionized and the hydrogen ions are transferred to the cathode via a solid polymer electrolyte membrane. During this process, electrons are generated and flow to an external circuit, providing DC (direct current) electric energy. As the air is supplied to the cathode, the hydrogen ions, electrons, and oxygen in the air react at the cathode and produce water. The water is exhausted from the fuel cell system by means of a cathode exhaust passage. Typically, not all of the water is exhausted from the cathode exhaust passage.

Back pressure valves, such as the two-position valve disclosed in commonly owned U.S. Pat. App. Pub. No. 20050186457, incorporated herein by reference in its entirety, are typically disposed in the cathode exhaust passage and control a pressure within the fuel cell system. If water remains in the vicinity of the back pressure valve and the fuel cell system is maintained in a low-temperature environment after the fuel cell system is shut off, water remaining in the cathode exhaust passage may freeze and form ice. The ice may contact the valve flap of the back pressure valve and prevent normal operation of the valve. When the back pressure valves are not operating normally, it may be difficult to restart the fuel cell system, which is undesirable.

It would be desirable to produce a back pressure valve for a fuel cell stack assembly, wherein the back pressure valve includes a flap that can be heated to facilitate a melting of ice that has formed on the valve flap, wherein an energy and a time that are required to bring the valve to normal operating condition are minimized.

SUMMARY OF THE INVENTION

Harmonious with the present invention, a back pressure valve for a fuel cell stack assembly, wherein the back pressure valve includes a flap that can be heated to facilitate a melting of ice that has formed on the valve flap, wherein an energy and a time that are required to bring the valve to normal operating condition are minimized.

In one embodiment, a valve assembly comprises: a housing adapted to be disposed in a conduit; a valve flap disposed in the housing and adapted to selectively permit and militate against a flow of fluid through the housing, at least a portion of the valve flap formed from metal; and a solenoid disposed on the housing and in communication with a source of electrical power, an energization of the solenoid resulting in a generation of heat in the portion of the valve flap formed from metal.

In another embodiment, a valve assembly for a fuel cell stack comprises: a housing adapted to be disposed in a cathode exhaust conduit; a valve flap disposed in the housing and adapted to selectively permit and militate against a flow of fluid through the housing, at least a portion of the valve flap formed from metal; and a solenoid disposed on the housing and in communication with a source of electrical power, an energization of the solenoid resulting in a generation of heat in the portion of the valve flap formed from metal.

A method for heating a valve body is also disclosed, comprising the steps of: providing a valve including a housing and a valve flap adapted to selectively permit and militate against a flow of fluid through the housing, at least a portion of the valve flap formed from metal, wherein the valve housing includes a solenoid disposed thereon, the solenoid in communication with a source of electrical power; and energizing the solenoid to result in a generation of heat in the portion of the valve flap formed from metal.

DESCRIPTION OF THE DRAWINGS

The above, as well as other advantages of the present invention, will become readily apparent to those skilled in the art from the following detailed description of a preferred embodiment when considered in the light of the accompanying drawings in which.

DESCRIPTION OF THE PREFERRED EMBODIMENT

The following detailed description and appended drawings describe and illustrate various exemplary embodiments of the invention. The description and drawings serve to enable one skilled in the art to make and use the invention, and are not intended to limit the scope of the invention in any manner. In respect of the methods disclosed and illustrated, the steps presented are exemplary in nature, and thus, the order of the steps is not necessary or critical.

Figure 1:
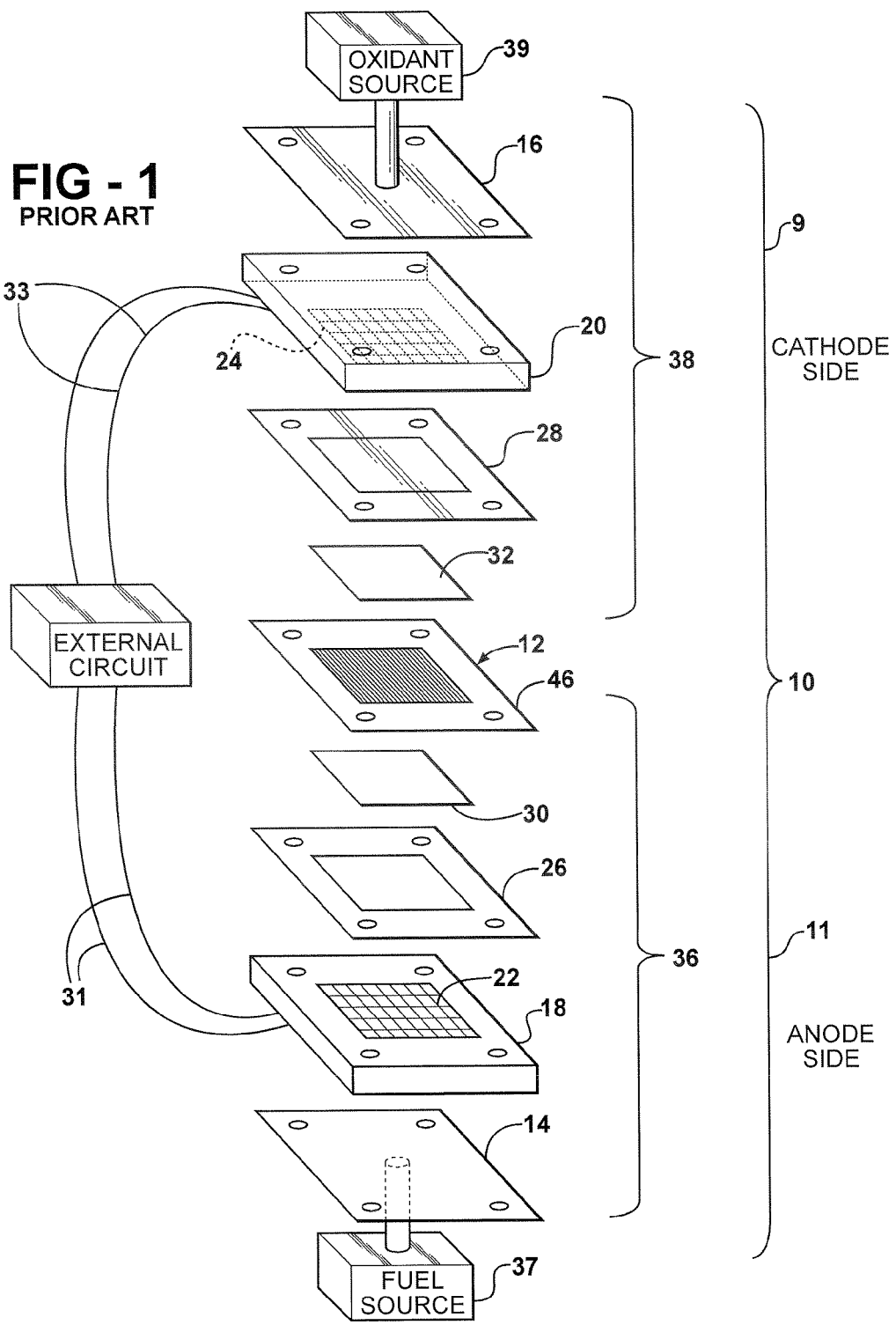
FIG. 1 is an exploded perspective view of a prior art fuel cell system.

FIG. 1 shows a fuel cell 10 having a cathode side 9 and an anode side 11. The anode side 11, the cathode side 9, and a coolant system (not shown) are collectively referred to as a wet end of the fuel cell 10. Insulation end plates 14, 16 are referred to as a dry end of the fuel cell 10. The fuel cell 10 is in fluid communication with a fuel source 37 and an oxidant source 39. Graphite blocks 18, 20 having a plurality of openings 22, 24 to facilitate fluid distribution are disposed adjacent the insulation end plates 14, 16. Gaskets 26, 28 and carbon cloth current collectors 30, 32 having respective connections 31, 33, are respectively disposed between a membrane electrode assembly (MEA) 12 and the blocks 18, 20. An oxidant and current transport means 36 is made up of the graphite block 18, the gasket 26, and the current collector 30. A fuel and current transport means 38 is made up of the graphite block 20, the gasket 28, and the current collector 32. The anode connection 31 and the cathode connection 33 are used to interconnect the fuel cell 10 with an external circuit (not shown), and may include other fuel cells (not shown) as desired.

A fuel cell stack (not shown) is constructed of a plurality of fuel cells 10 connected in series. A fuel cell stack as described herein is commonly used as a power plant for the generation of electric power in a vehicle, for example.

In use, a fuel such as hydrogen, for example, is supplied from the fuel source 37 and an oxidant such as oxygen, for example, is supplied from the oxidant source 39. The fuel and oxidant from respective sources 37, 39 diffuse through respective fluid and current transport means 36, 38 to opposing sides of the MEA 12. Porous electrodes (not shown) form an anode (not shown) at the anode side 11 and a cathode (not shown) at the cathode side 9, and are separated by a Proton Exchange Membrane (PEM) 46. The PEM 46 provides for ion transport to facilitate a chemical reaction in the fuel cell 10. Typically, the PEM 46 is produced from copolymers of suitable monomers. Such proton exchange membranes may be characterized by monomers of the structures:

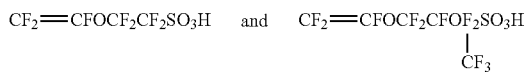

Such a monomer structure is disclosed in detail in U.S. Pat. No. 5,316,871 to Swarthirajan et al, incorporated herein by reference in its entirety.

Figure 2:
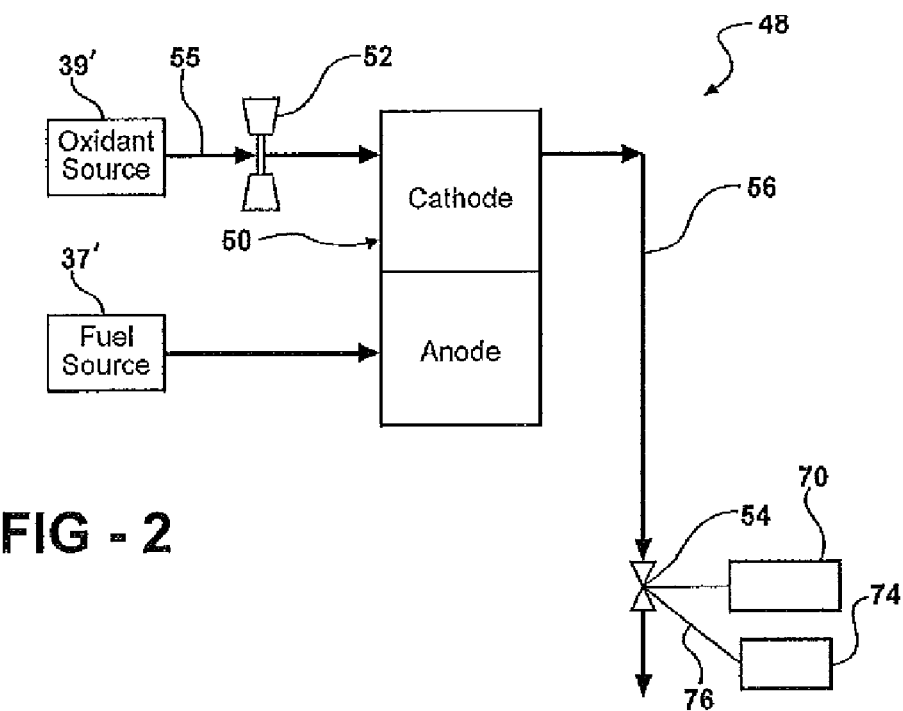
FIG. 2 is a schematic flow diagram of a fuel cell stack in accordance with an embodiment of the invention.

FIG. 2 shows a flow diagram of a fuel cell system 48 in accordance with an embodiment of the invention, wherein similar structure to that described above for FIG. 1 includes the same reference number followed by a prime (') symbol. The fuel cell system 48 includes a fuel source 37', an oxidant source 39', a fuel cell stack 50 including one or more fuel cells (not shown) as described above for FIG. 1, a compressor 52 such as a turbo-compressor, for example, and a back pressure valve 54. The oxidant source 39', the compressor 52, and the fuel cell stack 50 are in fluid communication by means of a main oxidant conduit 55. The fuel cell stack 50 and the back pressure valve 54 are in fluid communication by means of a cathode exhaust conduit 56.

Figure 3:
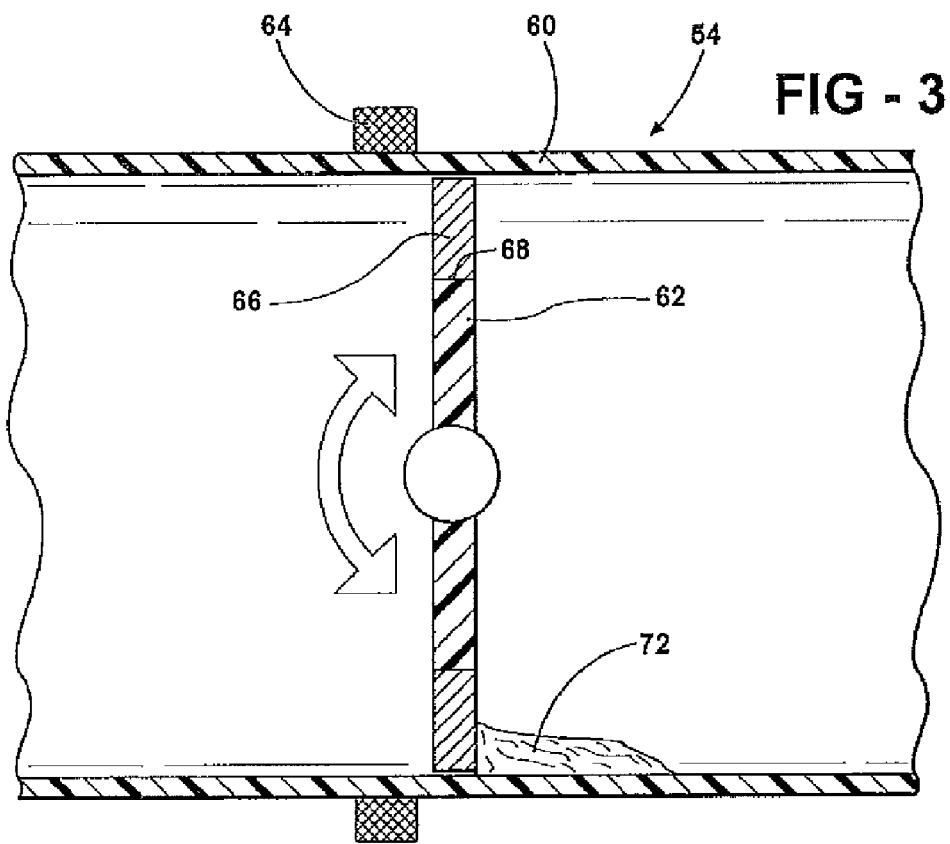
FIG. 3 is a fragmentary sectional view of the back pressure valve assembly illustrated in FIG. 2.

In the embodiment shown in FIG. 3, the back pressure valve 54 is a butterfly type multi-position valve. It is understood that other types of valves can be used as desired without departing from the scope and spirit of the invention. The back pressure valve 54 includes a valve housing 60 and a valve flap 62 or valve body pivotally disposed in the valve housing 60. In the embodiment shown, the valve housing 60 and the valve flap 62 are formed from plastic. It is understood that other materials can be used to form the valve housing 60 and the valve flap 62 as desired.

The valve housing 60 is adapted to be disposed in the cathode exhaust conduit 56 and includes a solenoid 64 disposed thereon. In the embodiment shown, the solenoid 64 is formed separately from and disposed on the valve housing 60. It is understood that the solenoid 64 can be formed integrally with the valve housing 60 as desired, such as wherein the solenoid 64 is disposed in a mold (not shown), and the valve housing 60 is thereafter formed in the mold.

The valve flap 62 includes a metal ring 66 disposed around an outer edge 68 thereof. It is understood that an annular array or other pattern of metal pieces (not shown) can be disposed in the valve flap 62 in place of the metal ring 66 as desired without departing from the scope and spirit of the invention. It is also understood that the valve flap 62 can be over molded around the metal ring 66 as desired. An actuator 70 is operably connected to the back pressure valve 54. It is understood that a controller (not shown) and instrumentation such as a temperature sensor (not shown), for example, can be provided for controlling the actuator 70.

In use, the fuel source 37' provides a fuel such as hydrogen, for example, to the fuel cell stack 50 and the oxidant source 39' provides an oxidant such as air, for example, to the fuel cell stack 50. Once in the fuel cell stack 50, a reaction between the oxidant and the fuel results in the creation of electrical energy. If the back pressure valve 54 is in an open position (approximately 90 degrees from the position shown in FIG. 3), the valve flap 62 permits the flow of fluid through the back pressure valve 54. As used herein, the term fluid can include gases, liquids, or any combination thereof. When in a closed position as shown in FIG. 3, the valve flap 62 militates against the flow of fluid through the back pressure valve 54.

During operation of the fuel cell system 48, an amount of water is produced as a by-product by the reaction between the fuel and the oxidant. The water is exhausted from the fuel cell system 48 by means of the cathode exhaust conduit 56. Typically, not all of the water produced by the reaction exits the fuel cell system 48. If water remains in the vicinity of the back pressure valve 54 and the fuel cell system 48 is maintained in a low-temperature environment after shut off, the water remaining in the cathode exhaust conduit 56 may freeze and form ice 72, as shown in FIG. 3. The ice 72 may contact the valve flap 62 of the back pressure valve 54, and prevent an opening and a closing thereof.

In the embodiment shown, upon a start-up of the fuel cell system 48, the solenoid 64 is energized by activating the solenoid 64 with an alternating current by an alternating current means 74, such as an alternating current generator, for example. The alternating current is transferred to the solenoid 64 via an alternating current transport means 76, such as a conductive wire, for example. Once the solenoid 64 energized by the alternating current, the solenoid 64 produces a magnetic field. The magnetic field induces a current in the metal ring 66. As a result of the current induced in the metal ring 66, heat is generated. It is understood that the heat may be generated by other means as desired, such as wherein the metal ring 66 is formed from a ferromagnetic material, and the energization of the solenoid 64 creates an alternating magnetization of the ferromagnetic material used to form the metal ring 66. In this embodiment, no current is induced in the metal ring 66, and the heat is generated by the alternating magnetization of the ferromagnetic material used to form the metal ring 66. Any ice 72 formed on the metal ring 66 or adjacent to the metal ring 66 is caused to melt. As the ice 72 melts, opening and closing of the back pressure valve 54 is facilitated.

The current is induced in the metal ring 66 by the magnetic field produced by the activated solenoid 64 without a direct contact between the metal ring 66 and the solenoid 64. Accordingly, a complexity of the back pressure valve 54 is minimized. Further, since only the metal ring 66 is heated as opposed to the entire back pressure valve 54, an amount of energy and time required to melt the ice 72 is minimized.

It is understood that instrumentation such as the temperature sensor can be used to activate the solenoid 64 when a predetermined temperature is reached.

From the foregoing description, one ordinarily skilled in the art can easily ascertain the essential characteristics and steps of this invention and, without departing from the spirit and scope thereof, can make various changes and modifications to the invention to adapt it to various usages and conditions.

What is claimed is:
1. A valve assembly comprising:
a housing adapted to be disposed in a conduit;
a plastic valve flap disposed in the housing and adapted to selectively permit and militate against a flow of fluid through the housing, a portion of the valve flap formed from metal, wherein the portion of the valve flap formed from metal is a metal ring surrounding the valve flap along an outer edge thereof; and
a solenoid disposed on the housing and in communication with a source of electrical power, an energization of the solenoid resulting in a generation of heat in the portion of the valve flap formed from metal, wherein the heat is generated by an induction of an alternating current in the portion of the valve flap formed from metal.

2. The valve assembly according to claim 1, wherein the valve assembly is disposed in a cathode exhaust conduit.

3. The valve assembly according to claim 1, wherein the solenoid is formed integrally with the housing.

4. The valve assembly according to claim 1, wherein the metal ring is formed from a ferromagnetic material.

5. The valve assembly according to claim 4, wherein the heat is generated by an alternating magnetization of the ferromagnetic material.

6. A valve assembly for a fuel cell stack comprising:
a housing adapted to be disposed in a cathode exhaust conduit;
a plastic valve flap disposed in the housing and adapted to selectively permit and militate against a flow of fluid through the housing, a portion of the valve flap formed from metal, wherein the portion of the valve flap formed from metal is a metal ring surrounding the valve flap along an outer edge thereof; and
a solenoid disposed on the housing and in communication with a source of electrical power, an energization of the solenoid resulting in a generation of heat in the portion of the valve flap formed from metal, wherein the heat is generated by an induction of an alternating current in the portion of the valve flap formed from metal.

7. The valve assembly according to claim 6, wherein the metal ring is formed from a ferromagnetic material.

8. The valve assembly according to claim 7, wherein the heat is generated by an alternating magnetization of the ferromagnetic material.

9. The valve assembly according to claim 6, wherein the solenoid is formed integrally with the housing.

10. A valve assembly comprising:
a plastic housing adapted to be disposed in a conduit;
a plastic valve flap disposed in the housing and adapted to selectively permit and militate against a flow of fluid through the housing, the plastic valve flap including a metal ring disposed around an outer edge thereof, the metal ring including a ferromagnetic material; and
a solenoid formed integrally with the plastic housing and in communication with a source of electrical power, an energization of the solenoid resulting in a generation of heat in the metal ring by an induction of an alternating current in the metal ring.

11. A cathode exhaust conduit comprising the valve assembly of claim 10.

12. A fuel cell system comprising a cathode exhaust conduit comprising the valve assembly of claim 10.

* * * * *